July 23, 1963 A. K. SIMONS 3,098,676
SEAT SUSPENSION SYSTEM
Filed April 20, 1961 3 Sheets-Sheet 1

INVENTOR.
ALLISON K. SIMONS
BY
ATTORNEY

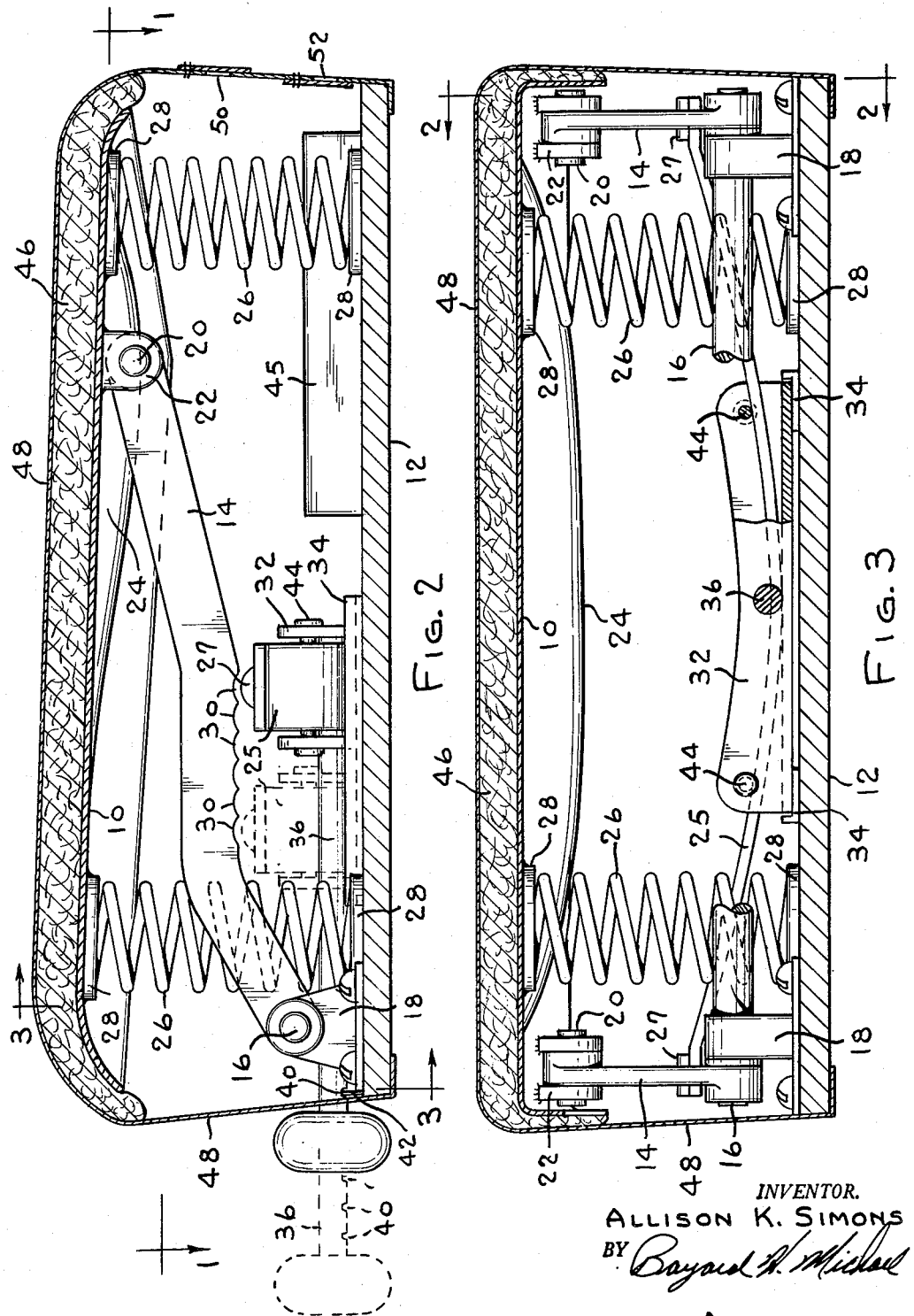

July 23, 1963  A. K. SIMONS  3,098,676

SEAT SUSPENSION SYSTEM

Filed April 20, 1961  3 Sheets-Sheet 3

INVENTOR.
ALLISON K. SIMONS
BY Bayard D. Michael
ATTORNEY

United States Patent Office 3,098,676
Patented July 23, 1963

3,098,676
SEAT SUSPENSION SYSTEM
Allison K. Simons, Milwaukee, Wis., assignor to Bostrom Corporation, Milwaukee, Wis., a corporation of Wisconsin
Filed Apr. 20, 1961, Ser. No. 104,350
4 Claims. (Cl. 297—307)

This invention relates to a seat suspension system, and particularly, to a combined suspension and shock absorbing system for automotive vehicles.

The design of a seat for a rough riding vehicle that is subject to intermittent or abnormally rough riding conditions presents special problems. When a rough road condition is encountered, the driver is subjected to severe bouncing due to the high frequency of vibration of the main suspension system. This condition has been corrected by utilizing a separate seat suspension to damp and reduce the frequency of the vibrations transmitted to the seat from the main suspension system so the driver will not be subjected to severe bouncing. Shock absorbing systems have been added to the seat suspension systems to damp the motion of the seat suspension system under severe bouncing conditions, and thus provide a smooth ride. These suspension systems involve complicated linkages in order to provide substantially vertical motion for the seat with shock absorbing systems added to the suspension system to damp the motion of the seat under severe bouncing conditions. Generally, these systems are mounted under or in back of the seat and require a considerable amount of space in the vehicle. Seats provided with suspension systems and shock absorbers are costly to manufacture, therefore their use is limited to devices where such requirements are essential for safe driving.

The primary object of this invention is to provide a simplified suspension system for the seat of automotive vehicles which can be manufactured at a minimum of cost.

Another object of this invention is to combine the simplified suspension system with a shock absorbing system to provide a compact seat.

These objects are accomplished by pivoting a seat pan on a pair of arms which are pivotally connected to a base member. The seat pan is contoured so that anyone sitting in the seat will be forced to sit in only one part of the seat pan, thus localizing the center of gravity of the occupant of the seat at the pivotal axis of the seat. The suspension system is preloaded to maintain a predetermined distance between the seat and the base and can be varied to accommodate different weight drivers. The seat pan is covered with a cushion material such as foam rubber and the space between the seat pan and base enclosed by a cover which is sealed to the base. The cover or base is provided with a number of restricted orifices which allow for the free flow of air into and out of the enclosed space under normal riding conditions and restrict the flow of air under severe bouncing conditions and thereby limit or damp the motion of the seat.

Other objects and advantages will be pointed out in, or be apparent from, the specification and claims, as will obvious modifications of the several embodiments shown in the drawings, in which:

FIG. 2 is taken on line 2—2 of FIG. 1 showing a side view of the suspension system;

FIG. 3 is a view taken on line 3—3 of FIG. 2 showing a front elevation of the suspension system;

Figure 1:
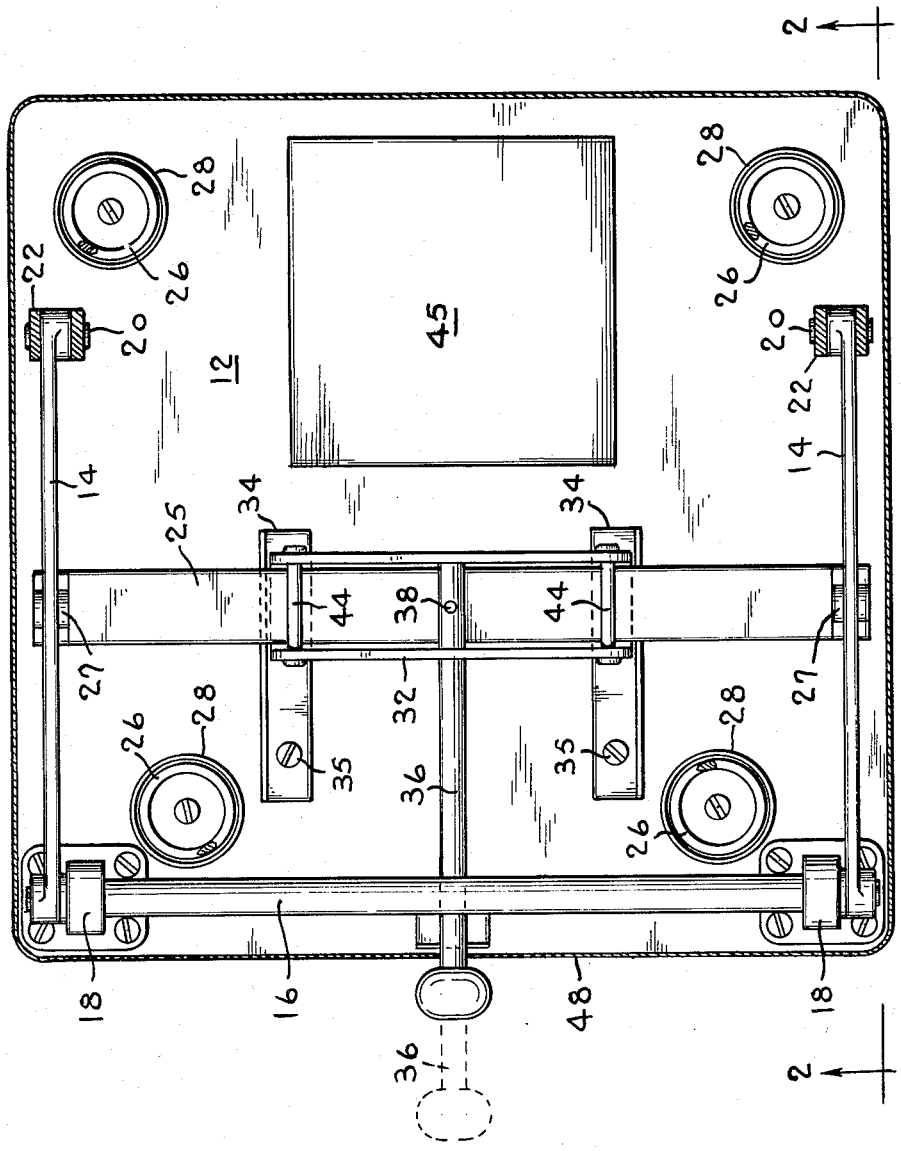
FIG. 1 is a top view taken on line 1—1 of FIG. 2 showing the suspension system mounted on a base.

Referring more particularly to the drawings, a seat pan 10 is shown supported on a base 12 by a pair of arms 14 which are pivotally connected to rod 16 supported in bearing housings 18 on the base and to pins 20 supported in bearing housings 22 on the seat pan. The rod and pins are mounted in greaseless type bearings which have a service life sufficient to last as long as the seat. The seat pan has a hollowed out center section 24 which is designed to force an occupant of the seat to sit so that his center of gravity will be located substantially over a line drawn through the axis of pivot pins 20. Light springs 26 are positioned between cups 28 secured to the seat pan and base to hold the seat pan in a substantially parallel position with respect to the base. These springs are designed to provide sufficient force to maintain the seat in a generally parallel position with respect to the base and to support the seat when occupied by a light weight driver. Since the center of gravity of the occupant will be substantially over the axis of the pivot between the seat pan and the arms of the suspension system, the seat will always remain in a relatively parallel position with respect to the base during vertical motion of the seat. When the occupant sits too far forward or too far backward, the light springs will be compressed slightly, varying the relation of the seat pan to the base. The same relationship between the seat and the base can be obtained by substituting torsion springs on the axis of the seat pan for the light springs 26.

The arms of the suspension system are preloaded by a leaf spring 25 to provide sufficient force to support heavier weight occupants of the seat. This force may be varied by moving the leaf spring longitudinally with respect to the axis of rod 16 to increase or decrease the moment arm between the leaf spring and the axis of pins 20. The leaf spring has an arcuate knob 27 at each end to engage one of the notches 30 in the arms and is mounted in a channel member 32 which is slidable in L-brackets 34 secured to the base by screws 35. An adjusting arm 36 is secured to the leaf spring and channel member by means of a retaining pin 38 with notches 40 in the adjusting arm positioned to engage flange 42 to lock the leaf spring in a selected position. Limit pins 44 in the channel member limit the upward motion of the outer ends of the preloaded leaf spring so that they will not exert any force on the seat pan when unoccupied or when occupied by the lighter weight drivers.

A cushion 46 is secured to the seat pan and a cover 48 of coated fabric or the like is secured to the cushion with its edges sealingly secured to the outer edge of the base. The space between the seat pan and base is enclosed by the cover to form an air cushion between the seat pan and base. Vents 50 and 52 are provided in the back of the cover to allow for the free flow of air into and out of the space during normal riding motion. Whenever the seat is subjected to a severe bouncing motion, the vents will restrict the flow of air into and out of the space, thus providing a shock absorbing effect which will limit or damp such motion. A bottoming pad 45 may be provided on the base to cushion the seat pan in the event of a severe bouncing condition. The springs 26 normally hold the seat pan in the upper position holding the outer edge of the cover relatively tight between the seat and base. The limit pins 44 hold the ends of the leaf spring from engagement with the suspension arms when the seat is empty so that the leaf springs can be easily moved to vary the leverage on the preloaded spring.

Figure 4:
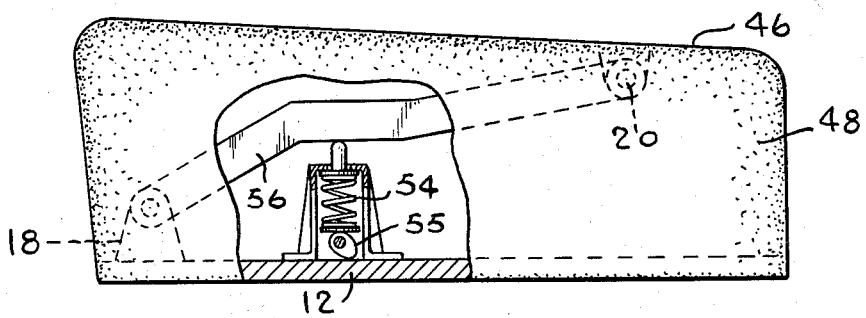
FIG. 4 is a view of a modified preloading arrangement for the suspension system utilizing a compression spring.

In FIG. 4 a modified suspension system is shown in which a rubber or steel compression spring 54 is used to preload arm 56. If a spring having a fixed spring rate is used, the preload will be varied by adjusting the distance of the spring from pivot point 18 on the base. When the distance of the spring from the pivot is fixed, the preload can be varied by adjusting the spring rate of the spring by rotating cam 55 to vary the lower end of the spring.

Figure 5:
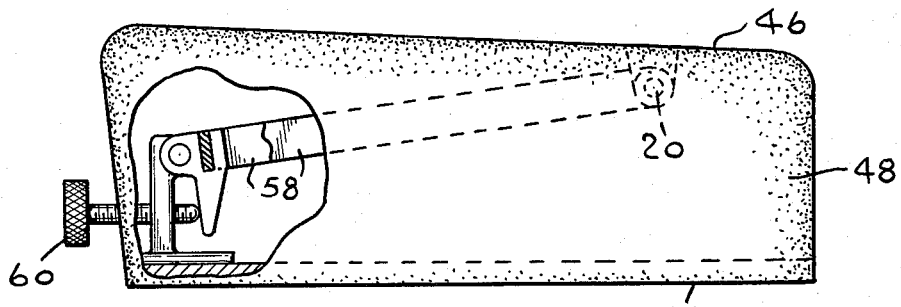
FIG. 5 is another view of a modified preloading arrangement utilizing a torsion bar.

In FIG. 5 a torsion bar 58 is shown secured to the base with the arms of the bar pivotally connected to the seat pan. The preload on the seat pan is adjusted by rotating knob 60 to angularly displace the center portion of the torsion rod. In both of the above figures the seat pan, cushion and cover structure will be the same as in FIGS. 1–3 so that the motion of the seat will be the same.

Figure 6:
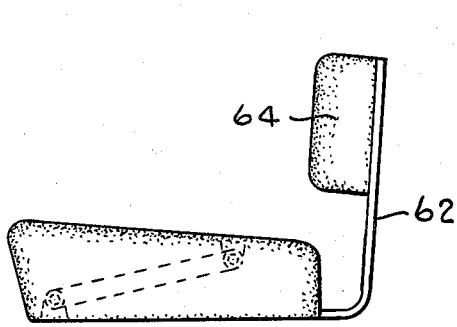
FIG. 6 shows the seat combined with a simple back structure.
Figure 7:
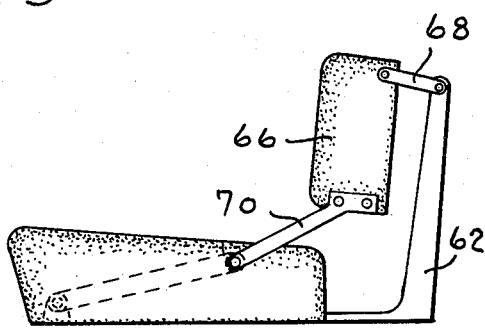
FIG. 7 is a view of a suspended back structure which is responsive to the motion of the seat.
Figure 8:
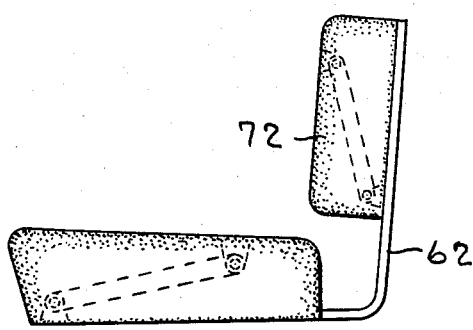
FIG. 8 is a view of a back structure similar to the seat structure.

Referring to FIGS. 6, 7 and 8, seat back structures are shown which can be combined with the seat if desired. In FIG. 6 the base is extended to provide a substantially vertical member 62 on which a soft foam rubber cushion 64 is mounted. In FIG. 7 member 62 supports a cushion 66 which is pivoted on a link 68 with the lower end of the cushion being rigidly secured to a pair of arms 70 that are pivotally connected to the seat so that the back responds to the movements of the seat. In FIG. 8 the member 62 supports a back cushion 72 which is identical to the seat shown in FIGS. 1 and 3 to provide the same shock absorbing features which are incorporated in the seat.

Although a number of embodiments of the present invention have been illustrated and described, it will be apparent to those skilled in the art that various changes and modifications may be made therein without departing from the spirit of the invention or from the scope of the appended claims.

I claim:

1. A seat suspension system comprising, a seat, a base, suspension means for supporting said seat on said base for generally vertical motion, said suspension means including adjustable biasing means for resisting the motion of the seat, and means for enclosing said seat and said suspension means to provide an air cushion between said seat and said base, and damping means including an air vent for restricting the flow of air from atmosphere into and out of the enclosure to damp high frequency and amplitude vibrations between the seat and the base.

2. A seat suspension system comprising, a seat, a base, a suspension means including an arm pivotally connected to the seat and to the base, said seat being contoured to provide an optimum sitting position for the occupant to substantially locate the center of gravity of the occupant on the axis of the pivotal connection between the arm and the seat member, selectively adjustable means for biasing said arm to resist motion of said seat member, and means for enclosing the space between the seat and the base including the suspension system to provide an air cushion between the seat and the base, said enclosing means being vented to atmosphere to damp high frequency and high amplitude motions of the seat by restricting the flow of air into and out of the enclosed space and providing the stabilizing force for maintaining the relation of the seat with respect to the base.

3. A seat suspension system comprising, a seat, a base, suspension means including a pair of arms pivotally connected to the base and to the opposite sides of the seat on a common transverse axis and biasing means disposed between the seat and the base on opposite sides of said common axis tending to move the seat away from the base and to stabilize the seat with respect to said common axis, a contour in said seat to provide an optimum sitting position for the occupant to substantially locate the center of gravity of the occupant on the common axis, and selectively adjustable means for biasing said arms to resist the motion of said seat toward the base.

4. A seat suspension system according to claim 3 including means for enclosing the space between the base and the seat and the suspension means therebetween to provide an air cushion below the seat, said enclosing means being vented to damp high frequency and high amplitude motions of the seat by restricting the flow of air into and out of the air cushion.

References Cited in the file of this patent

UNITED STATES PATENTS

| 403,078 | Swett | May 7, 1889 |
| 1,971,085 | Tissier | Aug. 21, 1934 |
| 2,269,968 | Baker | Jan. 13, 1942 |
| 2,606,592 | McIntyre | Aug. 12, 1952 |
| 2,636,544 | Hickman | Apr. 28, 1953 |

FOREIGN PATENTS

| 341,077 | Switzerland | Sept. 15, 1959 |